United States Patent
Hofmann et al.

(10) Patent No.: US 7,246,819 B2
(45) Date of Patent: Jul. 24, 2007

(54) AIRBAG MODULE AND METHOD OF RESTRAINING A VEHICLE OCCUPANT WITH SUCH AN AIRBAG MODULE

(75) Inventors: Achim Hofmann, Tuessling (DE); Harald Lutz, Buchbach (DE); Joachim Lutz, Schechingen (DE); Oskar Sponfeldner, Muehldorf (DE)

(73) Assignee: TRW Airbag Systems GmbH, Aschau Am Inn (DE)

( * ) Notice: Subject to any disclaimer, the term of this patent is extended or adjusted under 35 U.S.C. 154(b) by 0 days.

(21) Appl. No.: 11/545,314

(22) Filed: Oct. 10, 2006

(65) Prior Publication Data

US 2007/0085311 A1    Apr. 19, 2007

(30) Foreign Application Priority Data

Oct. 17, 2005  (DE) .................. 10 2005 049 553

(51) Int. Cl.
*B60R 21/276*    (2006.01)
(52) U.S. Cl. .................. 280/739; 280/735; 280/736; 280/743.2
(58) Field of Classification Search ............. 280/739, 280/743.2, 735, 742, 736
See application file for complete search history.

(56) References Cited

U.S. PATENT DOCUMENTS 4,394,033 A * 7/1983 Goetz et al. ............. 280/736
5,664,802 A * 9/1997 Harris et al. ............. 280/736
5,851,029 A * 12/1998 Klinger et al. ........... 280/736
6,431,596 B1* 8/2002 Ryan et al. ............... 280/739
6,773,030 B2  8/2004 Fischer
6,832,778 B2  12/2004 Pinsenschaum et al.
6,932,384 B2* 8/2005 Waid et al. ............... 280/739
6,986,529 B2* 1/2006 Fischer .................... 280/735
7,055,857 B2  6/2006 Marotzke
2004/0012180 A1* 1/2004 Hawthorn et al. ........ 280/739

FOREIGN PATENT DOCUMENTS

DE    10139626    3/2003
DE    10332549    3/2004

* cited by examiner

*Primary Examiner*—Eric Culbreth
(74) *Attorney, Agent, or Firm*—Tarolli, Sundheim, Covell & Tummino LLP

(57) ABSTRACT

An airbag module for a vehicle occupant restraint system includes an airbag (22) and a gas generator (10) that is connected via at least one first outflow opening (18) to an airbag chamber (28), the airbag chamber (28) being at least partially formed by the interior of the airbag (22), an actuator unit (36) being provided on the gas generator (10) and, when the actuator unit (36) is activated, it releases a traction element (50) that causes a pressure reduction in the airbag (22), an activation of the actuator unit (36) also leading to an opening of a second outflow opening (20) in the gas generator (10), which vents generator gas to an environment without this vented gas flowing into the airbag chamber (28).

Moreover, the invention relates to a method of restraining a vehicle occupant with such an airbag module.

13 Claims, 4 Drawing Sheets

AIRBAG MODULE AND METHOD OF RESTRAINING A VEHICLE OCCUPANT WITH SUCH AN AIRBAG MODULE

TECHNICAL FIELD

The present invention relates to an airbag module for a vehicle occupant restraint system, comprising an airbag and a gas generator that is connected via at least one first outflow opening to an airbag chamber that is at least partially formed by the interior of the airbag.

Moreover, the invention relates to a method of restraining a vehicle occupant with such an airbag module.

BACKGROUND OF THE INVENTION

In the early days of the development of vehicle occupant restraint systems using airbags, the main focus was initially to recognize a restraint situation reliably and quickly as well as to cause the airbag to be filled rapidly in order to protect a vehicle occupant. Starting from those basic requirements, the demands made of modern vehicle occupant restraint systems have increased dramatically since that time. Additional requirements that have come to the fore are, for example, that the response of the restraint system be adapted to the restraint position of the vehicle occupant and to the anticipated impact momentum of the vehicle occupant.

The state of the art describes numerous attempts to meet these ever-higher demands. Thus, for example, U.S. patent application 2004/0012180 A1 describes a vehicle occupant restraint system that can release an additional airbag volume as a function of the situation and, at the same time, can close an opening in the module housing. The basic idea here is to be able to use an inexpensive, one-stage gas generator that is configured for the optimal filling of the maximum airbag volume. In order to achieve approximately the same airbag hardness for the smaller airbag volume, excess gas is vented through an opening in the module housing. Depending on the embodiment, the opening or the closing of airbag openings can be coupled to the release of the larger airbag volume.

The object of the present invention is to create an airbag module with simple means that responds as specifically as possible to changes in individual parameters of a restraint situation such as, for example, the vehicle occupant position or the anticipated impact momentum of the vehicle occupant.

BRIEF SUMMARY OF THE INVENTION

This is achieved in an airbag module for a vehicle occupant restraint system including an airbag and a gas generator that is connected via at least one first outflow opening to an airbag chamber, the airbag chamber being at least partially formed by the interior of the airbag, an actuator unit being provided on the gas generator and, when the actuator unit is activated, it releases a traction element that causes a pressure reduction in the airbag, an activation of the actuator unit also leading to an opening of a second outflow opening in the gas generator, which vents generator gas to an environment without this vented gas flowing into the airbag chamber.

The term airbag chamber is used within the scope of this invention to refer to the space that essentially reaches airbag internal pressure when the airbag is deployed. As a rule, this space comprises the airbag interior and, depending on the attachment site of an airbag orifice, possibly also comprises sections of the housing of a module.

The second outflow opening is provided directly in the gas generator and, in general, has a relatively small outflow cross section. Therefore, a gas mass flow with a decisive effect on the airbag deployment and airbag hardness can only be vented at high pressure via the second outflow opening. Corresponding pressures of up to 150 bar (or even more, depending on the design of the gas generator) prevail in the gas generator directly after its activation. In contrast, the traction element that causes a pressure reduction in the airbag is only especially effective once a certain internal pressure has built up in the entire airbag chamber, especially in the interior of the airbag, that is to say, precisely not at the beginning of the deployment phase of the airbag. Consequently, in an inexpensive and advantageous manner, only one actuator unit has to be provided that releases the traction element as well as the second outflow opening although, depending on the point in time of the release, the effect of the traction element compared with the effect of the second outflow opening is negligible and vice versa. Consequently, a single actuator unit can respond to two independent cases such as, for example, the restraint position of the vehicle occupant and the weight of the vehicle occupant, largely independently of each other.

In one embodiment, when the actuator unit is activated, the traction element opens at least one airbag opening and/or releases an enlarged airbag volume. Both of these measures are very simple and effective ways to reduce the pressure in the airbag.

Preferably, the actuator unit has a pyrotechnical device. Pyrotechnically driven actuators are relatively inexpensive and have a fast response or activation time.

Together with the actuator unit, the gas generator can form a cylinder/piston unit, the piston being moved by the activation of the actuator unit, thus opening the second outflow opening. This cylinder/piston unit is a very reliable device and merely has to be slid in order to open the outflow openings. No closure devices have to be destroyed, as a result of which no free membrane fragments or the like are created that could enter the airbag and damage it.

In this embodiment, the piston preferably has an opening, the gas vented through the second outflow opening flowing through that opening. The cross section of this opening can serve to define the ratio of the pressures present on both sides of the piston above which ratio the piston moves. Moreover, the opening in the piston, together with the second outflow opening, defines the outflow cross section and thus the mass flow of gas that can be vented through the second outflow opening.

In a preferred embodiment, the vented gas exits the airbag module when it flows through the second outflow opening. Due to this direct outflow of the excess gas into the environment, an especially effective and fast pressure relief is achieved inside the airbag chamber. This significant reduction of the internal pressure in the airbag is especially necessary for vehicle occupants who are positioned relatively close to the airbag module.

In another embodiment, the gas generator has a separate base section and a distribution section that are securely and preferably directly connected to each other, the actuator unit being attached to the distribution section. This offers the advantage that decisive gas generator components such as the base section, can remain unchanged and only secondary components such as the distribution section have to be modified in order to receive the actuator unit.

Moreover, at least one airbag opening can be provided, the ratio of the outflow cross section of all of the second outflow openings to the outflow cross section of all of the airbag openings being between 1:2 and 1:8, preferably between 1:3 and 1:5. At these ratios, the timing of the effects caused by the second outflow opening and by the airbag opening are uncoupled from each other especially well.

The invention also provides a method of restraining a vehicle occupant, the method having the following steps:

a) activation of a gas generator of a vehicle occupant restraint system in case of a restraint event, whereupon the gas generator feeds gas into an airbag chamber via at least one first outflow opening;

b) checking the vehicle occupant position on the basis of sensor data at a prescribed first point in time;

c) activation of an actuator unit if the vehicle occupant is in a position that is unsuitable for a restraint, as a result of which a second outflow opening as well as a traction element are released and a pressure reduction takes place decisively as a result of venting gas into the environment through the second outflow opening;

d) assessment of an impact momentum of the vehicle occupant against the airbag based on sensor data at a prescribed second point in time;

e) activation of the actuator unit if the actuator unit was not yet activated in Step c) and if the anticipated impact momentum of the vehicle occupant lies below a predefined limit value, as a result of which the second outflow opening and the traction element are released and a pressure reduction in the airbag takes place decisively as a result of releasing the traction element. This method offers the advantage that only one actuator unit is needed to be able to respond to two different restraint parameters largely independently of each other. A significant aspect here is the point in time of the activation of the actuator unit, the configuration of the traction element and of the second outflow opening as well as the way in which they are coordinated with each other.

It is especially advantageous for the restraint of the vehicle occupant for the first point in time to be between 0 ms and 15 ms and for the second point in time to be between 25 ms and 40 ms after the restraint case has been recognized.

DETAILED DESCRIPTION OF THE PREFERRED EMBODIMENTS

Figure 1:
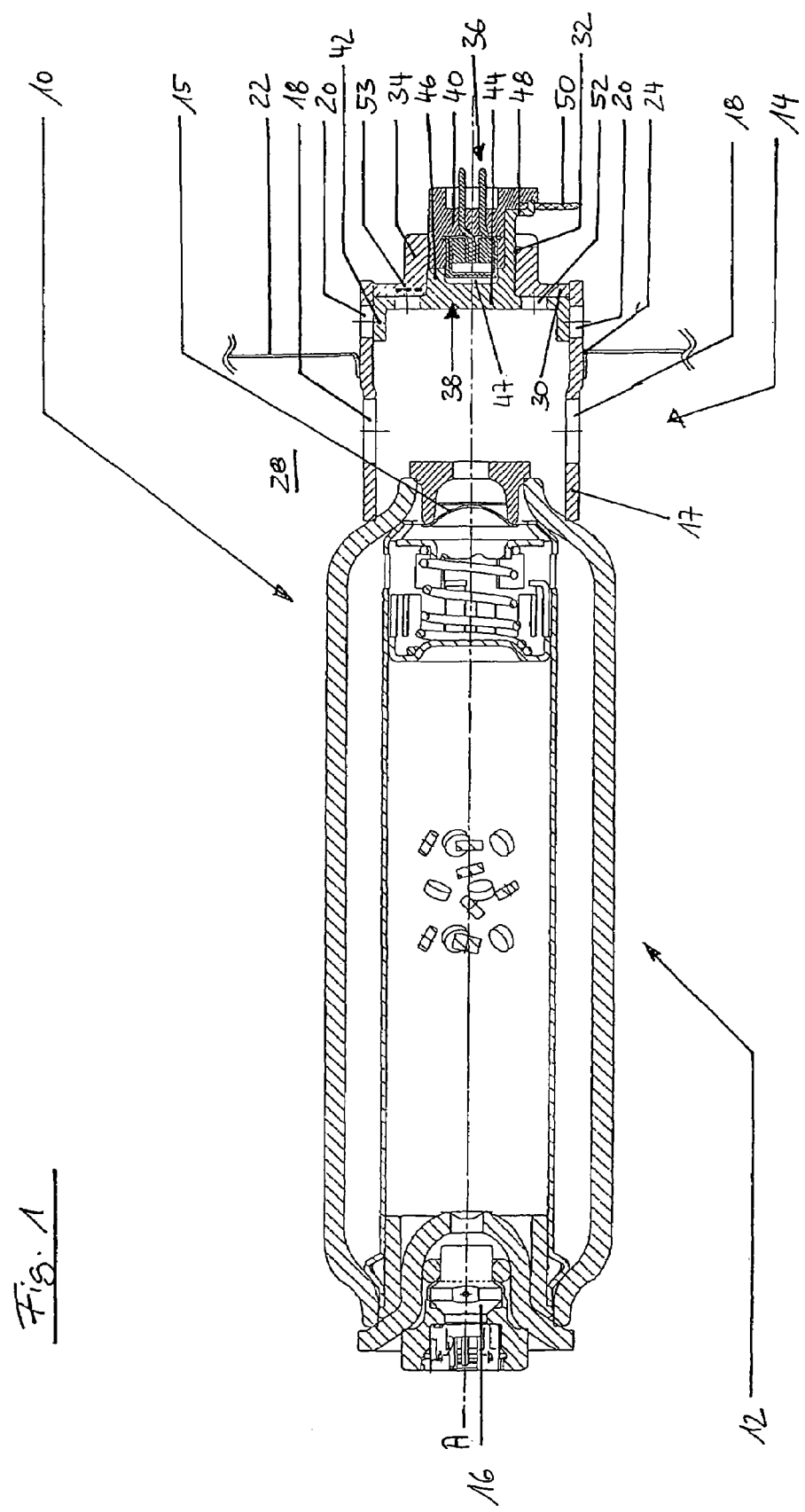
FIG. 1 shows a longitudinal section through the gas generator of an airbag module according to the invention, the actuator unit not having been activated.

FIG. 1 shows an airbag module having a gas generator 10 consisting essentially of a base section 12 and a distribution section 14, the base section 12 being a pressure chamber section and/or a combustion chamber section. In the embodiment depicted, which is a hybrid gas generator, the base section 12 is closed by a membrane 15. It is immaterial, however, whether the generator gas is already present in the form of compressed gas, whether it is generated as combustion gas or whether it exits from the base section 12 as mixed gas. The only important aspect is that the base section 12 has to have an activation means 16 and has to be able to establish a flow connection with the distribution section 14 in order to feed generator gas into the distribution section 14. In the example shown, this is done by destroying the membrane 15 in response to the activation of the activation means 16. It is especially preferred for all of the generator gas to be fed into the distribution section 14 and to be distributed there.

In the embodiment according to FIG. 1, the distribution section 14 is placed as a separate part onto the base section 12. The two sections 12, 14, however, are securely and permanently connected directly to each other, for example, by means of welding, screwing or press forming so that they form a preassembled unit. In other embodiments, the distribution section 14 is formed integrally with the base section 12. In the present example, the gas generator 10 is configured as a tubular gas generator, the base section 12 and the distribution section 14 having a shared axis A.

A circumferential wall 17 of the distribution section 14 has first outflow openings 18 and second outflow openings 20 in a radial direction, the first outflow openings 18 being situated axially closer to the base section 12 than the second outflow openings 20. The first and second outflow openings 18, 20 are preferably distributed along the circumference of the distribution section 14 in such a way that the generator gas is dissipated in a shear-neutral manner when it flows through the first and/or second outflow openings 18, 20.

An airbag 22 is attached by its airbag orifice 24 to the circumferential wall 17 of the distribution section 14 in the axial direction between the first outflow openings 18 and the second outflow openings 20 so that generator gas that is flowing through the first outflow openings 18 is released into an airbag chamber 28 that starts outside of the gas generator 10, and generator gas that is flowing through the second outflow openings 20 is dissipated into the environment outside of the airbag chamber 28.

At one axial end of the gas generator 10, the distribution section 14 has a face wall 30 with an axial projection 34 facing outwards, a centered opening 32 being provided in the face wall 30 and in the projection 34. An actuator unit 36, including a piston 38 running inside the distribution section 14 and a pyrotechnical device 40, extends through the opening 32. The pyrotechnical device 40 is, for example, an igniter or a detonator. The pyrotechnical device 40 extends from outside of the gas generator 10 into the opening 32 and is securely and tightly connected to the axial projection 34, for example, welded. The axially movable piston 38 has a circumferential piston wall 42 that makes a transition into a base plate 44 having an axial piston projection 46. The piston projection 46 likewise extends into the opening 32 so that it is adjacent to the pyrotechnical device 40, forming a virtually gas-tight pressure chamber 47 with the pyrotechnical device 40. Moreover, a hook-shaped holder 48 is formed integrally with the piston projection 46, the holder 48 extending outwards through the opening 32 and through the pyrotechnical device 40.

In an initial position according to FIG. 1, the second outflow openings 20 are closed by the piston 38, or to put it more precisely, by the piston wall 42. The base plate 44 of the piston 38 has openings 52 and, in the initial position, the base plate 44 lies against the face wall 30 of the distribution section 14 so that the openings 52 are likewise closed.

Outside of the gas generator 10, the hook-shaped holder 48 engages with the pyrotechnical device 40, thereby affixing a traction element 50. The traction element 50 is preferably a cable or a fabric strip so that it can easily be affixed to the holder 48 by means of a loop or a recess.

Figure 2:
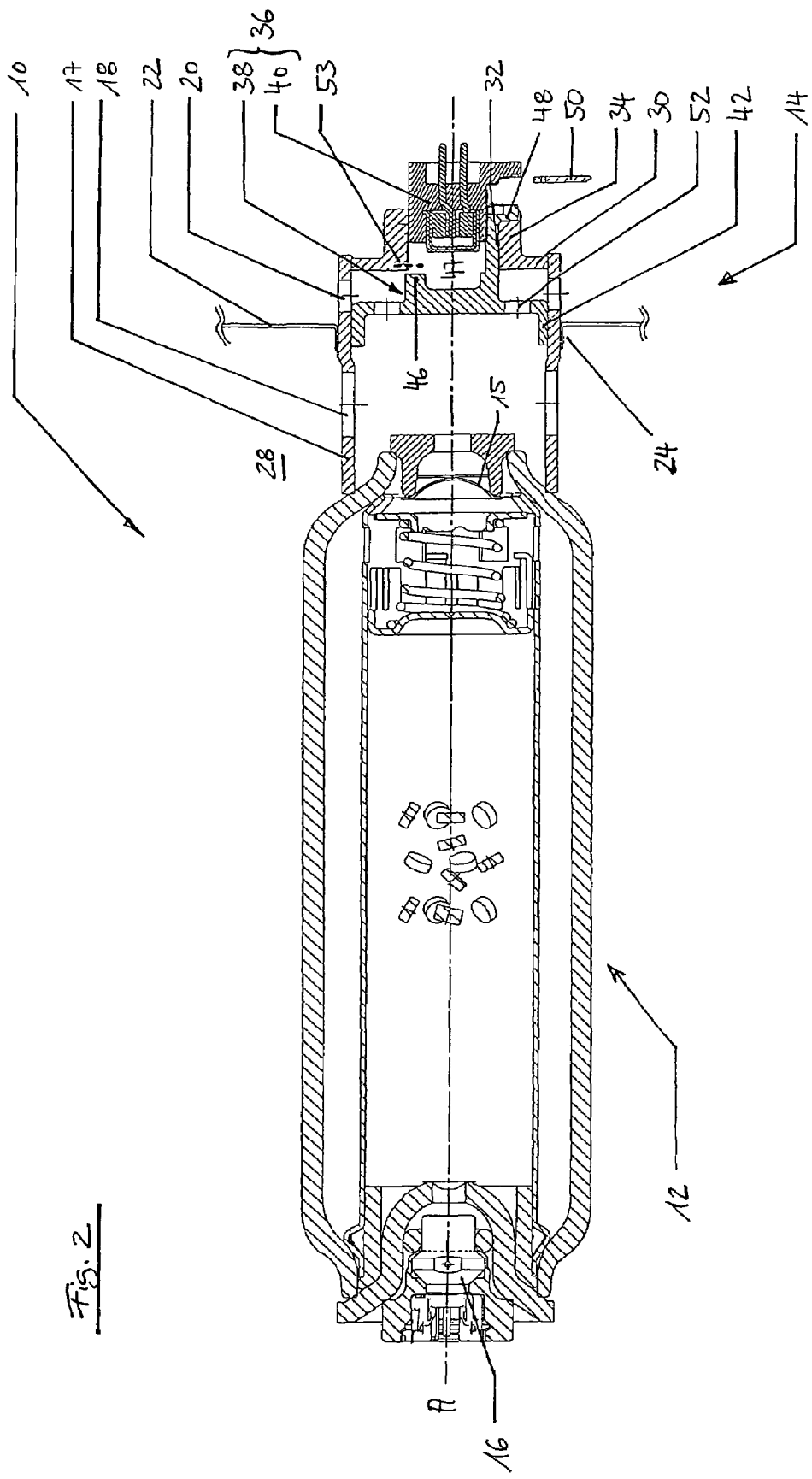
FIG. 2 shows a longitudinal section through the gas generator of FIG. 1, the actuator unit having been activated.

FIG. 2 shows the section according to FIG. 1, but now after an activation of the actuator unit 36. As a result of this activation, such a high pressure builds up in the pressure chamber 47 that the piston 38 is moved in the direction of the base section 12. Due to this movement, the openings 52 in the base plate 44 move away from the face wall 30. Furthermore, the piston wall 42 slides along the circumferential wall 26 of the distribution section 14 and releases the second outflow openings 20. In this activation position, generator gas can flow through the first outflow openings 18 into the airbag chamber 28 as well as through the openings 52 and through the second outflow openings 20 to outside of the airbag chamber 28.

As a rule, the actuator unit 36 is activated after the activation of the gas generator 10 so that a certain pressure already prevails in the distribution section 14. The actuator unit 36 has to be configured in such a way that it can move the piston 38 against this pressure. Here, the requisite force can be influenced by the size of the openings 52. Before the piston wall 42 reaches the first outflow openings 18, the circumferential wall 26 of the distribution section 14 tapers slightly so that the movement of the piston 38 is stopped. Before the piston 38 reaches the tapered section, the axial piston projection 46 emerges from the opening 32 of the face wall 30 so that an equalization takes place between the pressure in the distribution section 14 and the pressure in the pressure chamber 47. In order to prevent the piston 38 from being forced back in the direction of the pyrotechnical device 40 due to the outflowing generator gas after the piston 38 has moved in the direction of the base section 12, a stop has to be provided so that the second outflow openings 20 continuously remain open.

For example, the piston projection 46 can be slightly pre-tensioned outwards relative to the axial projection 34 of the face wall 30 in the radial direction so that it widens slightly and latches outwards after emerging from the opening 32. Due to this widening, the piston projection 46 can no longer move back into the opening 32 of the face wall 30 but rather strikes one edge of the opening. As an alternative, a spring-loaded pin 53 (indicated by means of a broken line) can also be provided in the face wall 30. When the piston 38 moves, this pin 53 slides on the piston projection 46 until the latter emerges from the opening 32 and the pin 53 then snaps in the direction toward the axis A. The pin 53 then constitutes a stop for the piston 38 and prevents the second outflow openings 20 from closing again.

The hook-shaped holder 48 also moves when the piston 38 moves from the initial position according to FIG. 1 into the activation position according to FIG. 2. The pyrotechnical device 40 and the holder 48 are no longer engaged, as a result of which the traction element 50 is released (see FIG. 2).

Figure 3:
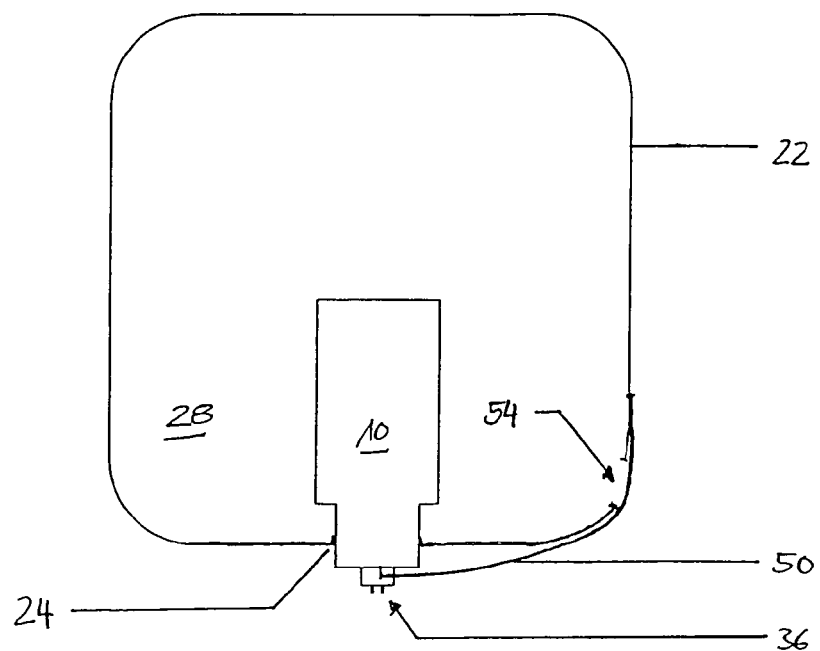
FIG. 3 shows the schematic representation of an airbag module according to the invention in a first embodiment.
Figure 4:
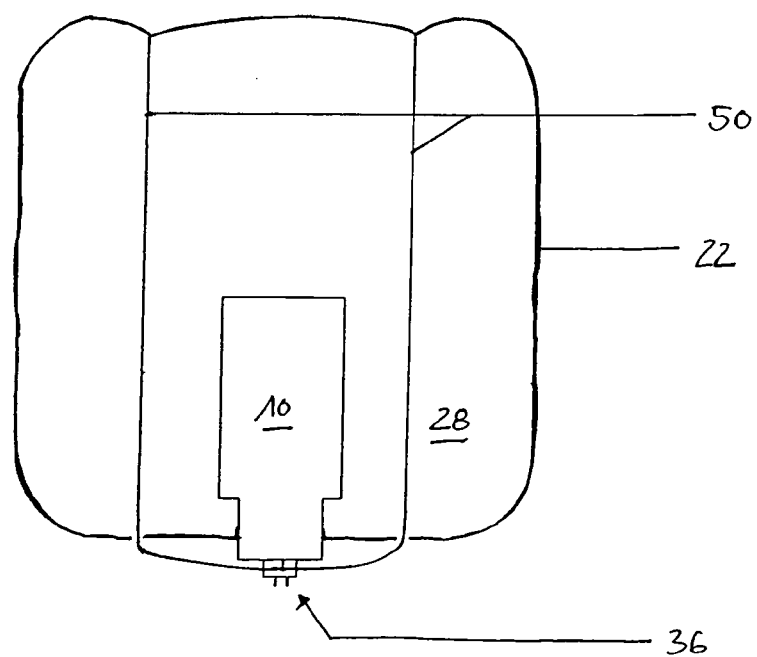
FIG. 4 shows the schematic representation of an airbag module according to the invention in a second embodiment.

FIGS. 3 and 4 are schematic depictions of examples of possible variants of the traction element.

FIG. 3 shows the airbag module in its initial position, the traction element 50 preferably being a wide fabric strip that covers an airbag opening 54, that is to say, closes it. One end of the traction element 50 is permanently attached, preferably sewn, to the airbag 22 on the outside.

When the actuator unit 36 is activated and the piston 38 subsequently moves, an opposite end of the traction element 50 and thus the airbag opening 54 are released in order to reduce the pressure in the airbag 22. The airbag opening 54 is provided in the movable part of the airbag 22, that is to say, outside of a module housing (not shown here). Consequently, it only achieves its full effect once the airbag 22 is already in an advanced stage of its deployment.

A second variant of the pressure reduction in the airbag 22 is shown in FIG. 4. Once again, the airbag module is shown in its initial position, in this case, the airbag 22 being prevented from deploying completely by the traction element 50. Here, the traction element 50 consists of two traction cables or traction strips, one respective end of which is attached to an airbag wall facing the vehicle occupant. The respective opposite ends of the two traction cables or traction strips are affixed onto the gas generator 10 by means of the holder 48.

After the activation of the actuator unit 36 and the resultant release of the traction element 50, the airbag 22 can occupy a larger volume, as a result of which the internal pressure in the airbag chamber 28 is reduced, which makes the airbag 22 softer.

In other embodiments, the traction means variants according to FIGS. 3 and 4 are combined.

Figure 5:
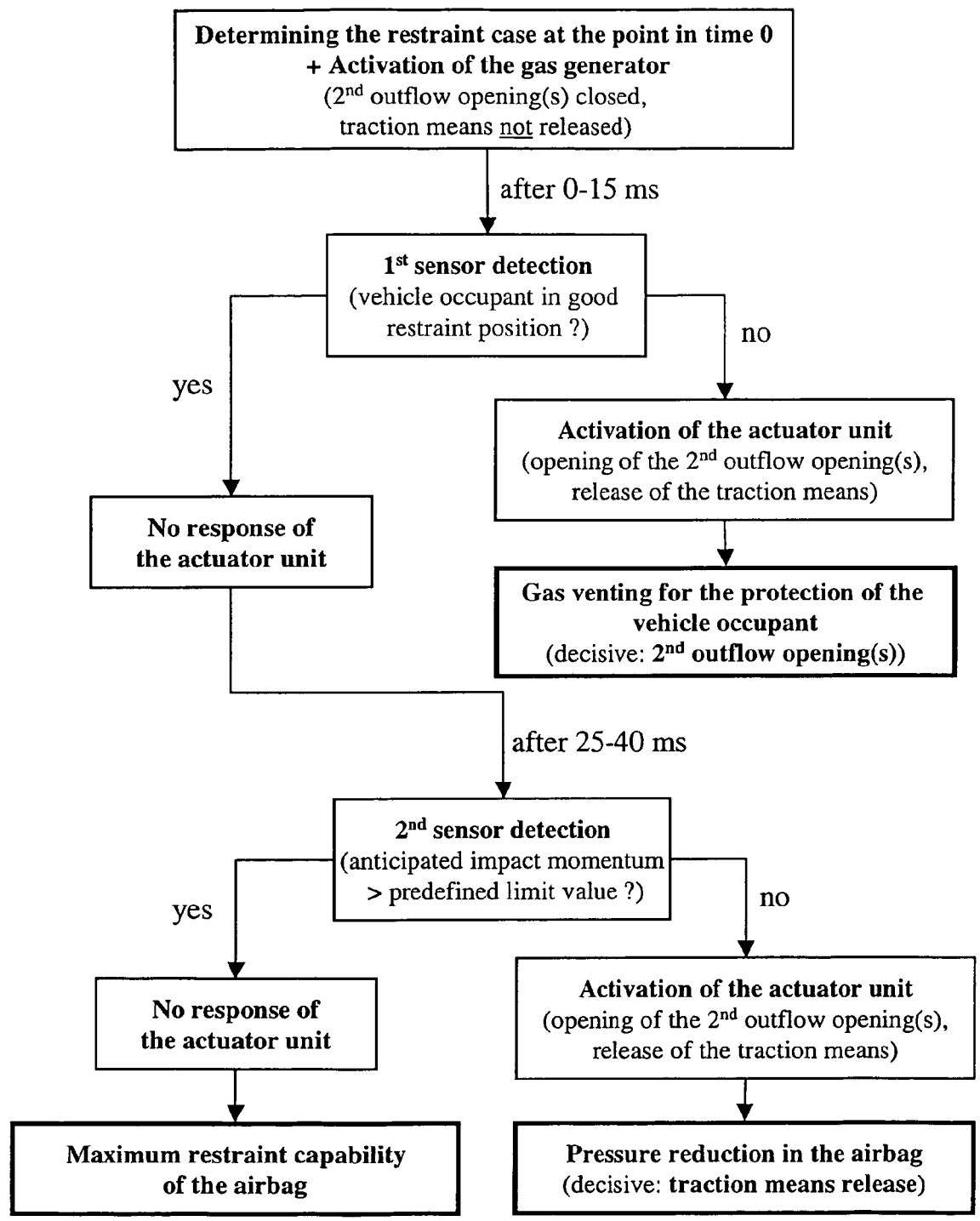
FIG. 5 shows a flowchart relating to a preferred method variant according to the invention for restraining a vehicle occupant.

FIG. 5 shows the sequence of a preferred method variant for the restraint of a vehicle occupant.

First of all, at a point in time 0, a restraint case is detected and the gas generator 10 is activated. As a rule, one or more suitable sensors are provided on or in the vehicle in order to detect the restraint case. At this point in time, the second outflow openings 20 are closed and the traction element 50 has not been released. This corresponds to the situation shown in FIG. 1.

After 0 to 15 ms, a first sensor detection determines the position of the vehicle occupant. If the sensor system ascertains an unsatisfactory restraint position of the vehicle occupant or if such a position is stored (e.g. if the vehicle occupant is monitored before the collision), then the actuator unit 36 is activated. This means that the second outflow openings 20 as well as the traction element 50 (secondary in terms of its effect) are released. At such an early point in time, the airbag 22 is hardly or not at all unfolded, although a high pressure is already present in the gas generator 10. This is why the venting of the gas through the second outflow openings 20 in the gas generator 10 is decisive for the inflation behavior. Even at relatively small cross sections (diameter <5 mm), a gas mass flow of 30% to 50% of the total generator gas that is present can be branched off through the second outflow openings 20. Before this backdrop, the further pressure reduction that occurs after a certain unfolding due to the release of the traction element 50 is negligible and possibly even desirable.

If the vehicle occupant is in a good restraint position, then the actuator unit 36 does not respond at first and a second sensor detection is carried out after 25 to 40 ms. During this sensor detection, an anticipated impact momentum of the vehicle occupant onto the airbag is compared to a predefined, empirically determined limit value. The anticipated impact momentum is determined on the basis of the decisive sensor data such as the weight of the vehicle occupant, sitting position and/or deceleration values (as indicators of the severity of the collision). Here, of course, it is also possible that the data for determining the impact momentum or even the impact momentum itself is already present or was determined ahead of time.

If the anticipated impact momentum lies above the pre-defined limit value, which is often the case especially with excessively heavy vehicle occupants, then the actuator unit 36 does not respond and the airbag 22 reaches its maximum restraint capability. This is also the case in the embodiments in which the airbag 22 then does not reach its maximum restraint volume (FIG. 4), since the airbag is very hard.

If the anticipated impact momentum lies below the predefined limit value, then the actuator unit 36 is activated. This means that the traction element 50 as well as the second outflow openings 20 (secondary in terms of their effect) are released. At this relatively late point in time, the airbag 22 is already largely unfolded. The pressure in the gas generator 10 and in the airbag chamber 28 has already equalized and is relatively low (approximately 0.5 bar above atmospheric pressure). Therefore, in this case, no appreciable pressure reduction due to the small second outflow openings 20 in the gas generator 10 is to be expected. At this point in time, the traction element is decisive, either releasing an airbag opening and/or an enlarged airbag volume.

In the embodiment with an airbag opening 54, the ratio of the outflow cross section of all of the second outflow openings 20 to the outflow cross section of all of the airbag openings 54 lies between 1:2 and 1:8, preferably between 1:3 and 1:5. Hence, up to the time of a vehicle occupant impact, a gas mass flow in the order of magnitude of about 10% of the total generator gas can be dissipated. This increases especially the restraint comfort for lightweight vehicle occupants or at low vehicle speeds. An equivalent effect can be provided by the variant in which an additional airbag volume is made available by releasing the traction element 50. This additional airbag volume likewise corresponds to about 10% of the original airbag volume.

The invention claimed is:

1. An airbag module for a vehicle occupant restraint system, comprising an airbag (22) and a gas generator (10) that is connected via at least one first outflow opening (18) to an airbag chamber (28), said airbag chamber (28) being at least partially formed by an interior of said airbag (22), an actuator unit (36) being provided on said gas generator (10) said actuator unit (36) when activated, releasing a traction element (50) that causes a pressure reduction in said airbag (22), an activation of said actuator unit (36) also leading to an opening of a second outflow opening (20) in said gas generator (10), which vents generator gas to an environment without this vented gas flowing into said airbag chamber (28).

2. The airbag module according to claim 1, wherein, when said actuator unit (36) is activated, said traction element (50) initiates at least one of opening at least one airbag opening (54) and releasing an enlarged airbag volume.

3. The airbag module according to claim 1, wherein said actuator unit (36) has a pyrotechnical device (40).

4. The airbag module according to claim 1, wherein said actuator unit (36) has a piston (38) that is installed inside said gas generator (10).

5. The airbag module according to claim 1, wherein together with said actuator unit (36), said gas generator (10) forms a piston and cylinder unit, a piston (38) being moved by an activation of said actuator unit (36), thus opening said second outflow opening (20).

6. The airbag module according to claim 5, wherein said piston (38) has an opening (52), said gas vented through said second outflow opening (20) flowing through said opening (52).

7. The airbag module according to claim 1, wherein said vented gas exits said airbag module when it flows through said second outflow opening (20).

8. The airbag module according to claim 1, wherein said gas generator (10) has a separate base section (12) and a distribution section (14) that are securely connected to each other, said actuator unit (36) being attached to said distribution section (14).

9. The airbag module according to claim 1, wherein at least one airbag opening (54) is provided, a ratio of an outflow cross section of all of said second outflow openings (20) to an outflow cross section of all of said airbag openings (54) being between 1:2 and 1:8.

10. A method of restraining a vehicle occupant comprising the following steps:
   a) activation of a gas generator (10) of a vehicle occupant restraint system in case of a restraint event, whereupon said gas generator (10) feeds gas into an airbag chamber (28) via at least one first outflow opening (18);
   b) checking said vehicle occupant position on the basis of sensor data at a prescribed first point in time;
   c) activation of an actuator unit (36) if said vehicle occupant is in a position that is unsuitable for a restraint, as a result of which a second outflow opening (20) as well as a traction element (50) are released and a pressure reduction takes place mainly as a result of venting gas into an environment through said second outflow opening (20);
   d) assessment of an impact momentum of said vehicle occupant against said airbag based on sensor data at a prescribed second point in time;
   e) activation of said actuator unit (36) if said actuator unit (36) was not yet activated in Step c) and if said anticipated impact momentum of said vehicle occupant lies below a predefined limit value, as a result of which said second outflow opening (20) and traction element (50) are released and a pressure reduction in said airbag (22) takes place mainly as a result of releasing said traction element (50).

11. The method according to claim 10, wherein said first point in time lies between 0 ms and 15 ms after said restraint case has been recognized.

12. The method according to claim 10, wherein said second point in time lies between 25 ms and 40 ms after said restraint case has been recognized.

13. The method according to claim 10, wherein said traction (50) in Step c) and Step e) releases at least one of an airbag opening (54) and an enlarged airbag volume.

* * * * *